United States Patent
Tao et al.

(10) Patent No.: US 10,972,389 B2
(45) Date of Patent: Apr. 6, 2021

(54) NEXT-HOP COMPONENT SELECTION ALONG A SERVICE FUNCTION PATH

(71) Applicant: INTERNATIONAL BUSINESS MACHINES CORPORATION, Armonk, NY (US)

(72) Inventors: Zi Jin Tao, Wuxi (CN); Yuan Yuan Zhang, Wuxi (CN); Ping Li, Shanghai (CN); Jing CJ Cai, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/513,801

(22) Filed: Jul. 17, 2019

(65) Prior Publication Data

US 2021/0021516 A1    Jan. 21, 2021

(51) Int. Cl.
*H04L 12/715* (2013.01)
*H04L 12/721* (2013.01)
*H04L 12/26* (2006.01)

(52) U.S. Cl.
CPC .......... *H04L 45/70* (2013.01); *H04L 43/0852* (2013.01)

(58) Field of Classification Search
CPC ............................ H04L 45/70; H04L 43/0852
See application file for complete search history.

(56) References Cited

U.S. PATENT DOCUMENTS

| | | | |
|---|---|---|---|
| 9,319,324 | B2 | 4/2016 | Beheshti-Zavareh |
| 9,491,094 | B2 | 11/2016 | Patwardhan |
| 9,705,775 | B2 | 7/2017 | Zhang |
| 2015/0195197 | A1 | 7/2015 | Yong |
| 2015/0326473 | A1 | 11/2015 | Dunbar |
| 2016/0099853 | A1 | 4/2016 | Nedeltchev |
| 2016/0344565 | A1 | 11/2016 | Batz |
| 2017/0187609 | A1 | 6/2017 | Lee |
| 2017/0214627 | A1 | 7/2017 | Zhang |
| 2017/0237656 | A1 | 8/2017 | Gage |
| 2017/0264537 | A1 | 9/2017 | Patil |
| 2017/0279712 | A1 | 9/2017 | Nainar |
| 2017/0317932 | A1 | 11/2017 | Paramasivam |
| 2018/0091424 | A1* | 3/2018 | Jalil ........................ H04L 45/30 |
| 2018/0198643 | A1* | 7/2018 | Ao .......................... H04L 12/46 |

(Continued)

OTHER PUBLICATIONS

Kumar et al., "Packet Delay Measurement for SFC", draft-agv-sfc-packet-delay-measurement-01, Jun. 28, 2016, pp. 1-17, Expires: Dec. 30, 2016.

(Continued)

*Primary Examiner* — Melvin C Marcelo
(74) *Attorney, Agent, or Firm* — Ewa M. Wozniak (57) ABSTRACT

A method, computer system, and computer program product for selecting a next-hop component for a packet from a group in a service function chain (SFC) enabled domain. The method may include receiving a request for selecting a next-hop component for a packet from a group in an SFC-enabled domain. The method may include collecting a delay measurement for packets of each of the plurality of components from a measurement agent in the SFC-enabled domain. The method may include selecting at least one component from the plurality of components based on the delay measurement for packets of each of the plurality of components. The method may include returning an indicator indicating at least one component.

18 Claims, 7 Drawing Sheets

(56) References Cited

U.S. PATENT DOCUMENTS

2019/0104076 A1    4/2019  Seetharaman
2019/0158398 A1*   5/2019  Nainar .................. H04L 45/64

OTHER PUBLICATIONS

Hantouti et al., Analysis of service function chaining forwarding methods, Advances and drawbacks, Conference Paper—May 2016, 6 pages.

Medhat et al., "Near Optimal Service Function Path Instantiation in a Multi-Datacenter Environment", 2015 IFIP, 6 pages.

Mell et al., "The NIST Definition of Cloud Computing", Recommendations of the National Institute of Standards and Technology, Special Publication 800-145, Sep. 2011, 7 pages.

Openstack, "Service Function Chaining Extension for OpenStack Networking", networking-sfc 8.1.0.dev7, Last Updated Jul. 23, 2017, 5 pages.

Kumar et al. "Performance Measurement Architecture for SFC", draft-agv-sfc-performance-measurement-architecture-02, Jun. 28, 2016, pp. 1-19, Expires: Dec. 30, 2016.

Zhang et al., "Service Chain Header", Network Working Group, Internet-Draft, Intended Status: Proposed Standard, Dated: Mar. 24, 2014, Expires: Sep. 25, 2014, draft-zhang-sfc-sch-00, pp. 1-15.

* cited by examiner

NEXT-HOP COMPONENT SELECTION ALONG A SERVICE FUNCTION PATH

BACKGROUND

Embodiments of the present invention relate to network services, and more specifically, to a method, system and computer product for selecting a next hop for a packet along a service function path in a service function chain (SFC) enabled domain.

The delivery of end-to-end services often requires various service functions. A non-exhaustive list of abstract service functions may include, but is not limited to, firewalls, wide area network (WAN) and application acceleration, Deep Packet Inspection (DPI), Lawful Intercept (LI), server load balancing, Network Address Translators (NATs), HOST_ID injection, Hyper Text Transfer Protocol (HTTP) Header Enrichment functions, and Transmission Control Protocol (TCP) optimizer, as well as application-specific functions.

BRIEF SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In an embodiment, a method for selecting a next-hop component for a packet from a group in a service function chain (SFC) enabled domain is disclosed. The method may include receiving a request for selecting a next-hop component for a packet from a group in a SFC enabled domain. The group may include a plurality of components. Each of the plurality of components may have a substantially similar function in the SFC-enable domain. The method may include collecting a delay measurement for packets of each of the plurality of components from a measurement agent in the SFC-enabled domain which monitors the delay measurement for packets of each of the plurality of components. The method may include selecting at least one component from the plurality of components based on the delay measurement for packets of each of the plurality of components. The method may include returning an indicator indicating at least one component as a response to the request. The component may be a component of service function forwarder or a component of service function instance.

In another embodiment, a computer system is disclosed. The computer system may include one or more computer processors, one or more computer readable storage media, and program instructions stored on the one or more computer readable storage media, the computer system may include program instructions to implement the above method.

In yet another embodiment, a computer program product is disclosed. The computer program product may include one or more computer readable storage media and program instructions stored on the one or more computer readable storage media, the computer program product may include program instructions to implement the above method.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
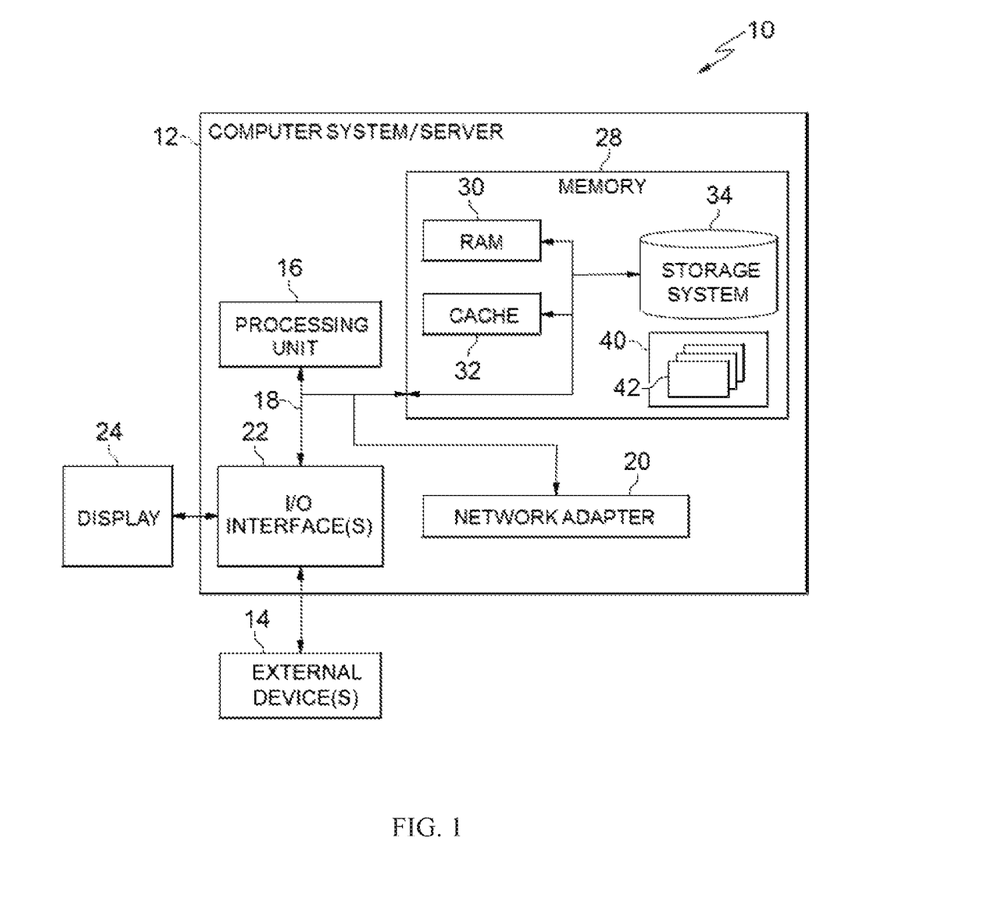
FIG. 1 depicts a cloud computing node according to an embodiment of the present invention.

Referring now to FIG. 1, a schematic of an example of a cloud computing node 10 is shown. The cloud computing node 10 is only one example of a suitable cloud computing node and is not intended to suggest any limitation as to the scope of use or functionality of embodiments of the disclosure described herein. The cloud computing node 10 is capable of being implemented and/or performing any of the functionality set forth hereinabove.

The cloud computing node 10 may include a computer system/server 12 or a portable electronic device such as a communication device, which is operational with numerous other general components or special purpose computing system environments or configurations. Examples of well-known computing systems, environments, and/or configurations that may be suitable for use with the computer system/server 12 may include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system-executable instructions, such as program modules, being executed by a computer system. Generally, program modules may include routines, programs, objects, components, logic, data structures, that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processing units 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

The computer system/server 12 may include a variety of computer system readable media. Such media may be any available media that is accessible by the computer system/server 12, and may include both volatile and non-volatile media, removable and non-removable media.

The system memory 28 may include computer system readable media in the form of volatile memory, such as random access memory (RAM) 30 and/or cache memory 32. The computer system/server 12 may further include other removable/non-removable, volatile/non-volatile computer system storage media. By way of example only, a storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 18 by one or more data media interfaces. As will be further depicted and described below, the memory 28 may include at least one program product having a set (e.g., at least one) of program modules that are configured to carry out the functions of embodiments of the disclosure.

A program/utility 40 may have a set (at least one) of program modules 42. The program/utility 40 may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 may generally carry out the functions and/or methodologies of embodiments of the disclosure as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. In addition, the computer system/server 12 may communicate with one or more networks such as a local area network (LAN), a general wide area network (WAN), and/or a public network (e.g., the Internet) via a network adapter 20. As depicted, the network adapter 20 may communicate with the other components of the computer system/server 12 via the bus 18. It should be appreciated that although not shown, other hardware and/or software components may be used in conjunction with the computer system/server 12. Examples may include, but are not limited to: microcode, device drivers, redundant processing units, external disk drive arrays, RAID systems, tape drives, and data archival storage systems, etc.

Figure 2:
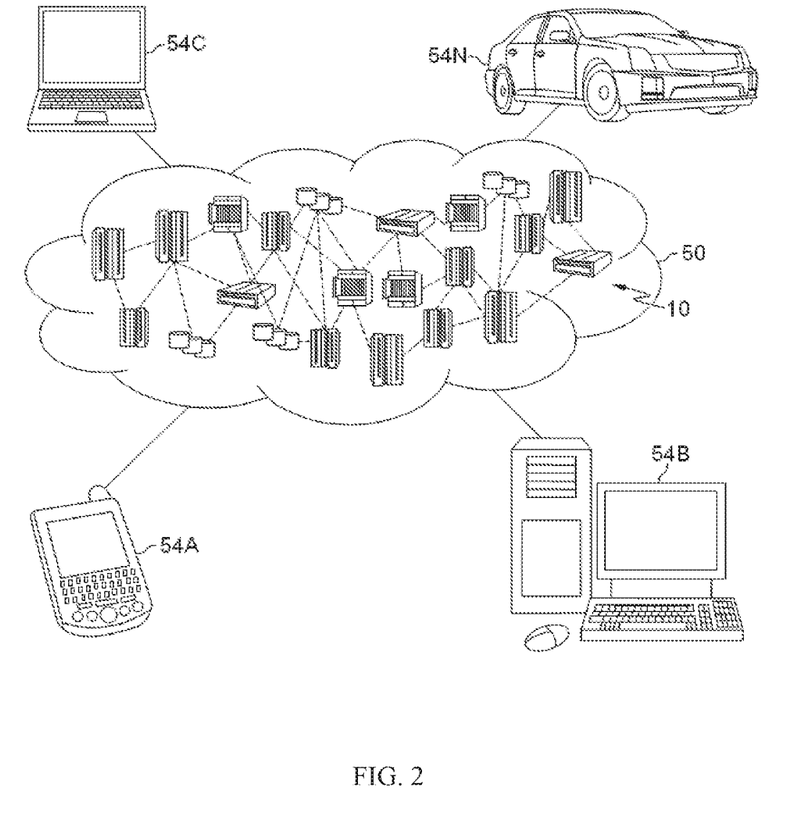
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
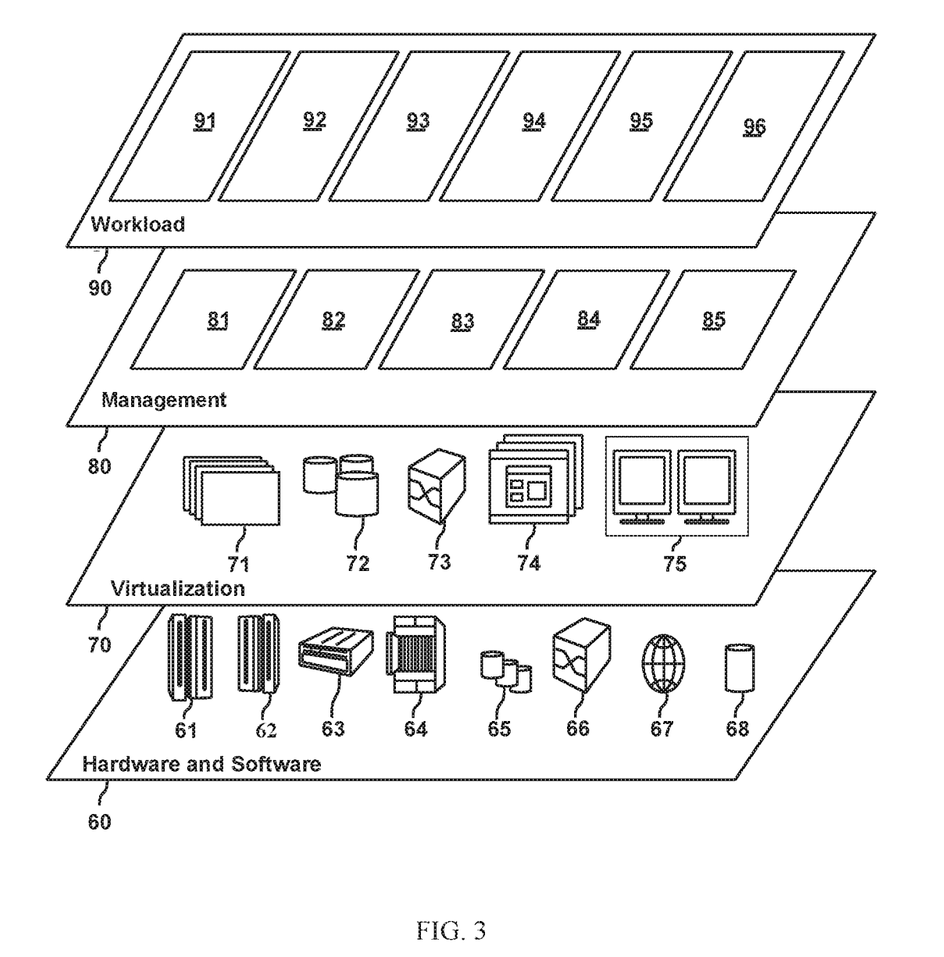
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and next-hop component selecting 96.

Some terms can be defined as follows for illustration. In the description, terms "next hop" and "next-hop component" have the same meaning and can be used interchangeably.

Service Function Chain (SFC): A SFC may define an ordered set of abstract service functions and ordering constraints that must be applied to packets received in an SFC-enabled domain.

Service Function (SF): A SF is a function that may be responsible for specific treatments of received packets. An SF may be SFC encapsulation aware (in which case, packets forwarded to the SF contain an SFC encapsulation) or unaware (in which case, packets forwarded to the SF do not contain the SFC encapsulation). This is often referred to as "SFC aware" and "SFC unaware", respectively.

Service Function Path (SFP): A SFP may be a constrained specification of where packets assigned to the SFP must go. The SFP provides a fully specified notion of exactly which SFF/SFs the packets will visit when they actually traverse the network.

Classifier: packets from the network that satisfy classification criteria may be directed into a SFP and be forwarded to requisite service function(s). Classification may be handled by a classifier.

Service Function Forwarder (SFF): A SFF may be responsible for forwarding received packets to one or more connected SFs according to information carried in the SFC encapsulation, as well as handling the packets coming back from the SF. Additionally, the SFF may be responsible for transporting the packets back from the SF to another SFF according to the information carried in the SFC encapsulation, and terminating the SFP, etc.

SFC encapsulation: A SFC encapsulation may carry explicit information used to identify the SFP and enables SFP selection. The SFC encapsulation may remain transport independent. As such, any network transport protocol may be used to carry SFC encapsulated packets.

Service Function Chaining (SFC) controller: A SFC controller may be responsible for constructing SFPs, translating SFCs to forwarding paths, and propagating path information to participating nodes (such as SFFs) to achieve requisite forwarding behavior to construct a service overlay.

The SFC technology may utilize a service-specific overlay that creates the service topology. The service overlay may provide SF connectivity, built "on top" of the existing network topology. It may allow operators to use whatever overlay or underlay they prefer to create a path between SFs and to locate SFs in the network as needed. Within the service topology, SFs may be viewed as resources for consumption and an arbitrary topology constructed to connect those resources in a required order.

For easy of illustration, SFC-aware SFs may be used in this invention as examples to describe technical solutions. However, it can be understood that SFC-unaware SFs may also be used in the technical solutions in the invention.

Figure 4:
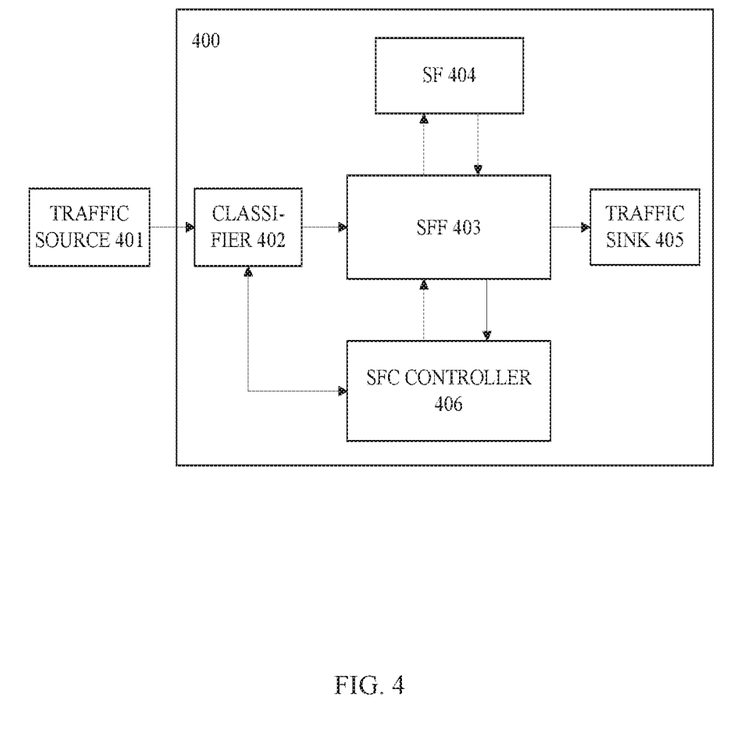
FIG. 4 depicts an existing block diagram of a system for a packet along a service function path in an SFC-enabled domain according to an embodiment of the present invention.

Fundamentally, the SFC technology may have the ability to cause network packets to route through an overlay network via a specific path. FIG. 4 depicts an existing block diagram of a system for a packet along an SFP in an SFC-enabled domain 400. In FIG. 4, a classifier 402 may send a packet received from a traffic source 401 to a traffic sink 405 in the SFC-enabled domain 400. The classifier 402 may first request an SFP from an SFC controller 406 in the SFC-enabled domain 400. The classifier 402 may encapsulate the packet to be an SFC encapsulated packet after the SFP is received from the SFC controller 406. The classifier 402 may forward the packet to an SFF 403 based on the SFP. After the packet is received, the SFF 403 may determine a next hop to be a SF 404 based on the SFP carried in the SFC encapsulation of the packet. The SFF 403 may forward the packet to the SF 404. The SF 404 may handle the packet after the packet is received and may then return the packet back to the SFF 403 based on the SFP carried in the SFC encapsulation of the packet. After the packet is received, the SFF 403 may forward the packet to a traffic sink 405 based on the SFP carried in the SFC encapsulation of the packet. The SFC controller 406 may communicate with each component in the SFC-enabled domain 400.

In the example of FIG. 4, only one SFF 403 and one SF 404 are involved. However, those skilled in the art may understand that there may be various SFFs along the SFP, and each SFF may be connected to various SFs. By way of example of FIG. 4, the SFF 403 and the SF 404, as software components along the SFP, are unique. If the SFF 403 or the SF 404 is too busy to provide services, the network packet flows may be delayed. As a result, throughput of the SFC may be low.

In this invention, a group of service function forwarder (GSFF) is proposed in which a plurality of SFFs that have substantially similar functions are comprised. Moreover, a group of service function instance (GSFI) is also proposed in which a plurality of service function instances (SFIs) that have substantially similar functions are comprised. Either the GSFF or the GSFI is a group in an SFC-enabled domain, and each component in the group is either a service function forwarder (SFF) or a service function instance (SFI).

Figure 5:
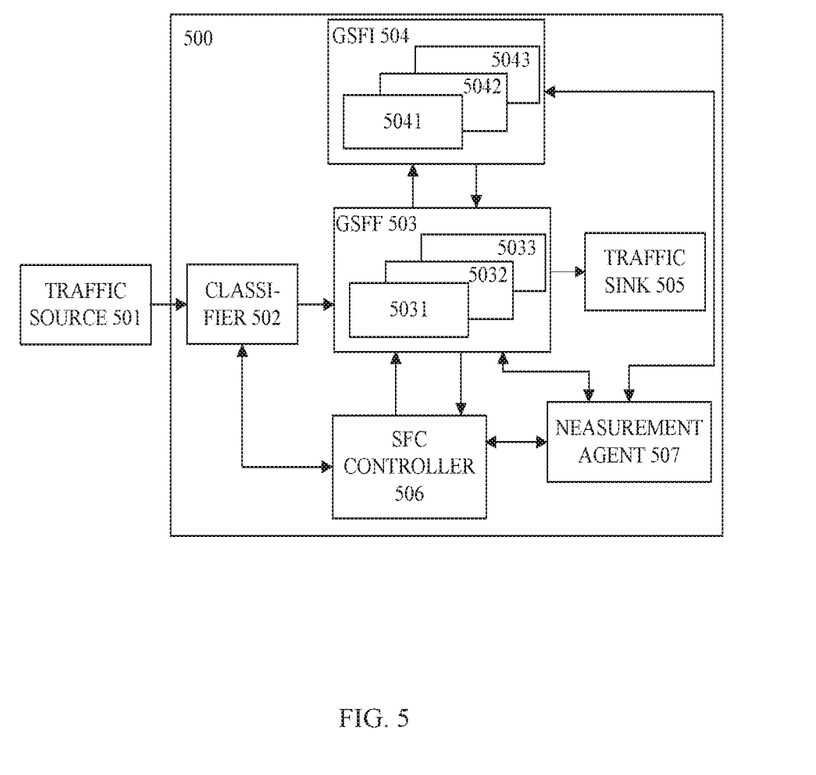
FIG. 5 depicts a block diagram of a system for selecting a next hop for a packet along a service function path in an SFC-enabled domain according to an embodiment of the present invention.

FIG. 5 depicts a block diagram of a system for selecting a next-hop component for a packet along an SFP in an SFC-enabled domain 500 according to an embodiment of the present invention. Referring to FIG. 5, a GSFF 503 may include a plurality of SFFs, for example, indicated by the reference numbers 5031, 5032 and 5033, in which each SFF may have a substantially similar function. Each SFF may forward packets received to one of a plurality of connected SFIs in a GSFI 504 according to information carried in the SFC encapsulation. In addition, the GSFI 504 may include a plurality of SFIs, for example, indicated by the reference numbers 5041, 5042 and 5043, in which each SFI may be regarded as an instance of the SF 403 in FIG. 4. Each SFI may have substantially similar function. Each SFI may process a specific treatment for received packets, such as "firewalls". Even though three SFFs and three SFIs are shown in FIG. 5 as an example, it should be appreciated that any number of SFF or SFI may be included in the respective groups.

In FIG. 5, a packet from a traffic source 501 may be requested to be transported from a classifier 502 to a traffic sink 505 in the SFC-enabled domain 500. The classifier 502 may request for an SFP from an SFC controller 506 first. The classifier 502 may then encapsulate the packet to be an SFC encapsulated packet after the SFP is received from the SFC controller. In the example of FIG. 5, the SFP is assumed to be {GSFF 503, GSFI 504}, which may be carried in the SFC encapsulation in the packet. When the classifier 502 is requested to forward the SFC encapsulated packet to a next hop in the SFP, the classifier 502 may find that the next hop for the packet is a GSFF that may include a plurality of SFFs, where each of the plurality of SFFs may have a substantially similar function. The classifier 502 may send a first request for a next-hop SFF to the SFC controller 506.

In some embodiments, when the SFC controller 506 receives the first request from the classifier 502, the SFC controller 506 may select at least one SFF from the plurality of SFFs in the GSFF 503. For example, if the SFF 5031 and the SFF 5032 are selected, then the SFC controller 506 may return an indicator indicating the two selected SFFs to the classifier 502 as a first response to the first request. In an embodiment, the indicator may be a pointer set that may include two pointers which point the two selected SFFs respectively. In another embodiment, the indicator may be a data structure, such as an array, a list or the like, in which names of the two selected SFFs, or IDs of the two selected SFFs or any symbols that can represent the two selected SFFs may be included. It should be understood that the indicator may be any other appropriate form existing nowadays or developed in the future and should not adversely limit the scope of the invention. The classifier 502 may forward the SFC encapsulated packet to one of the selected SFFs.

In some embodiments, the SFC controller 506 may collect the delay measurement for packets of each of the plurality of SFFs in the GSFF 503 and each of the plurality of SFIs in the GSFI 504 from a measurement agent 507. In an example, the delay measurement for packets of an SFF/SFI may be average delay time per packet for all packets through the SFF/SFI in a predefined duration. With continued reference to FIG. 5, the measurement agent 507 may monitor the performance of each SFF in the GSFF 503 and each SFI in the GSFI 504. The measurement agent 507 may especially monitor traffic delay of each SFF in the GSFF 503 and each SFI in the GSFI 504. The monitored traffic delay of each SFF in the GSFF 503 and each SFI in the GSFI 504 may be collected by the SFC controller 506 in various ways, such as a regular collection, a request-based collection, and the like. The detailed implementation may be referred to the IETF draft "PM Architecture for SFC" (https://datatracker.ietf.org/doc/draft-agv-sfc-performance-measurement-architecture/) and the IETF draft "Packet Delay Measurement for SFC" (https://datatracker.ietf.org/doc/draft-agv-sfc-packet-delay-measurement/). In some embodiments, at least one SFF may be selected based on the delay measurement of each of the plurality of SFFs.

In some embodiments, a first threshold for a delay measurement of an SFF may be predefined firstly, then at least one SFF from the plurality of the SFFs may be selected if the delay measurement of each of the at least one SFF is less than the predefined first threshold.

In some embodiments, the delay measurement of each of the at least one SFF may be sorted first and then an indicator indicating an SFF with a minimum delay measurement from the at least one SFF may be returned by the SFC controller 506. As a result, the classifier 502 may not need to further select one SFF from the at least one SFF to forward the SFC encapsulated packet. Using this method, the packet may be forwarded with a minimum delay.

In some embodiments, when at least one SFF is selected by the SFC controller 506, in a first example, the SFC controller 506 may further select one SFF randomly from at least one SFF and return an indicator indicating the selected one as the first response to the first request. In another example, the SFC controller 506 may select one SFF from at least one SFF based on a weight of each SFF of at least one SFF and return an indicator indicating the selected one as the first response to the first request. In the second example, each SFF of the plurality of the SFFs may have the weight, which may be related to a configuration of the SFF or may be related to other factor such as a usage frequency of the SFF, or the like. The SFC controller 506 may then further select an SFF with a maximum weight from at least one SFF and return an indicator indicating the selected one as the first response to the first request.

In some embodiments, the delay measurement of each of the at least one SFF may be returned together with an indicator indicating the at least one SFF to the classifier 502. The classifier 502 may then sort at least one SFF based on the delay measurement of each of the at least one SFF. After sorting, the classifier 502 may then select an SFF with a minimum delay measurement from the at least one SFF as the next-hop SFF. Using this method, the packet may be forwarded with a minimum delay.

In some embodiments, when the indicator indicating that at least one SFF is returned by the SFC controller 506 to the classifier 502, the classifier 502 may select one SFF randomly from the at least one SFF to forward the SFC encapsulated packet. In addition, the classifier 502 may select one SFF based on the weight of each SFF from the at least one SFF to forward the SFC encapsulated packet. The classifier 502 may then select an SFF with the maximum weight from the at least one SFF to forward the SFC encapsulated packet.

With above methods, the packet may be forwarded with a reasonable delay, and throughput of the GSFF may be improved.

After an SFF is selected to forward the packet, for example, the SFF 5032 may be selected, the classifier 502 may forward the SFC encapsulated packet to the SFF 5032. After the SFC encapsulated packet is received, the SFF 5032 may also find that the next-hop GSFI 504 for the packet is a GSFI that may include a plurality of SFIs, where each of the plurality of SFIs may have a substantially similar function. Accordingly, the SFF 5032 may send a second request for a next-hop SFI to the SFC controller 506.

The processing of the SFC controller 506 for the GSFI 504 is similar to the processing of the SFC controller 506 for the GSFF 503, which will not be repeated hereinafter. For example, if the SFI 5041 and the SFI 5042 are selected, then the SFC controller 506 may return an indicator indicating the two selected SFIs to the SFF 5032 as a second response to the second request. Next, the SFF 5032 may forward the SFC encapsulated packet to one of the SFIs 5041 and 5042.

In some embodiments, a second threshold for a delay measurement of an SFI may be predefined first. At least one SFI from the plurality of the SFIs may then be selected if the delay measurement of each of the at least one SFI is less than the predefined second threshold.

In some embodiments, the process of the SFF 5032 for the returned indicator indicating at least one SFI is similar to the process of the classifier 502 for the returned indicator indicating at least one SFF, which will not be repeated hereinafter. For example, if the SFF 5032 forwards the packet to the SFI 5041, the SFI 5041 may handle the packet and then may return the packet to the SFF 5032. The SFF 5032 may then forward the packet to a traffic sink 505 based on the SFP carried in the SFC encapsulation of the packet. With above solutions, the packet may be forwarded with a reasonable delay, and throughput of the GSFI may be improved.

After the at least one optional SFF or the at least one optional SFI is selected by the SFC controller 506, the selection may be defined as a flow rule for a next packet. The flow rule, similar to an item in a routing table, may be stored in a table structure or other data structure. Table 1 shows an example table of the flow rule, in which the GSFF/GSFI information and a next-hop SFF/SFI for the GSFF/GSFI may be included. In addition, the other information, such as information of the packet including source address, destination address, network protocol, and the like, may be included in the flow rule.

TABLE 1

| Group | Next hop | Timestamp |
|---|---|---|
| GSFF | SFF 5031, 5032 | 15:23:00:00 2001/12/25 |
| GSFI | SF 5041, 5042 | 15:23:00:00 2001/12/25 |
| ... | ... | ... |

After the SFC controller 506 adds a flow rule, the SFC controller 506 may propagate the added flow rule to all components in the same SFC-enabled domain in order that necessary components in the same SFC-enabled domain know the flow rule. As a result, there is no need for a next packet to request for the next-hop SFF/SFI from the SFC controller 506. For example, a first flow rule (line 2) in Table 1 may be further used by the classifier 502, and a second flow rule (line 3) in Table 1 may be further used by any SFF in the GSFF 503. In some embodiments, the SFC controller 506 may propagate the added flow rule to necessary specific components in the same SFC-enabled domain. For example, the SFC controller 506 may propagate the first flow rule in Table 1 to the classifier 502 and may propagate the second flow rule in Table 1 to the plurality of SFFs in the GSFF 503.

In some embodiments, a timestamp of a flow rule may be included, as shown in Table 1. If the timestamp of the flow rule is expired, the flow rule may be deleted by the SFC controller 506 or other components with the flow rule. The timestamp may make sure a reasonable validity period of the flow rule to satisfy a requirement that a delay sensitive component is always selected as a next hop along an SFP.

In some embodiments, the delay measurement of each SFF/SFI may be collected regularly. In other word, the measurement agent 507 may get the delay measurement of each component, such as each SFF and each SFI regularly and the SFC controller 506 may collect the measured delay regularly. Taking the GSFF 503 as an example, the delay measurement of each SFF may be collected every ten minutes. The time of a last collection for delay measurements is 15:13:00:00 2001/12/25. The current time for adding the first flow rule is 15:15:00:00 2001/12/25. The timestamp of the first flow rule in Table 1 may be set up to be the time period for a next collection for delay measurements, e.g. 15:23:00:00 2001/12/25. Then, if the classifier 502 receives packets to the GSFF at time between 15:15: 00:00 2001/12/25 and 15:23:00:00 2001/12/25, there is no need for the classifier 502 to request for a next-hop SFF from the SFC controller. Instead, the classifier 502 may forward a received packet directly to a next-hop SFF if the next hop is an SFF in the flow rule. IF there are a plurality of next-hop SFFs in the flow rule, one of the plurality of SFFs may be selected as needed. Thus, the time to request a next-hop SFF from the SFC controller 506 may be saved and throughput of the SFC-enable domain may be improved.

Continuing with the example from above, when it is 15:23:00:00 2001/12/25, the first flow rule in Table 1 may be deleted from Table 1. If another packet is received at 16:15:00:00 2001/12/25, a third flow may be generated. If time of last collection is 16:13:00:00 2001/12/25, the timestamp of the third flow rule in Table 1 may be set up to be 16:23:00:00 2001/12/25. Similar implementations may be applied to the GSFI 504.

In other embodiments, if the delay measurement of each SFF/SFI is collected in a manner of the request-based collection, the timestamp of a flow rule may be set up to be the current time plus a fix time period. For the above example, if the fix time period is set up to be 15 minutes, and current time for adding the first flow rule is 15:15:00:00 2001/12/25, the timestamp of the first flow rule in Table 1 may be set up to be 15:30:00:00 2001/12/25. Similar implementations may be applied to the GSFI 504.

Those skilled in the art can understand that other flow rules can be defined.

In some implementations, there may be a plurality of GSFFs/GSFIs along the SFP. Then there may be one flow rule for each GSFF/GSFI.

It also can be understood that the system structure in FIG. 5 is illustrated and described herein as a series of system representative of various system structure. The subject innovation is not limited by the illustrated system structure. For example, multiple GSFFs and/or multiple GSFIs may be included in FIG. 5. In addition, not all illustrated blocks, components, may be required for the system in accordance with the subject innovation. Moreover, it will be appreciated that the example system and other systems according to the innovation may be designed in association with the system illustrated and described herein, as well as in association with other systems and apparatus not illustrated or described.

Figure 6:
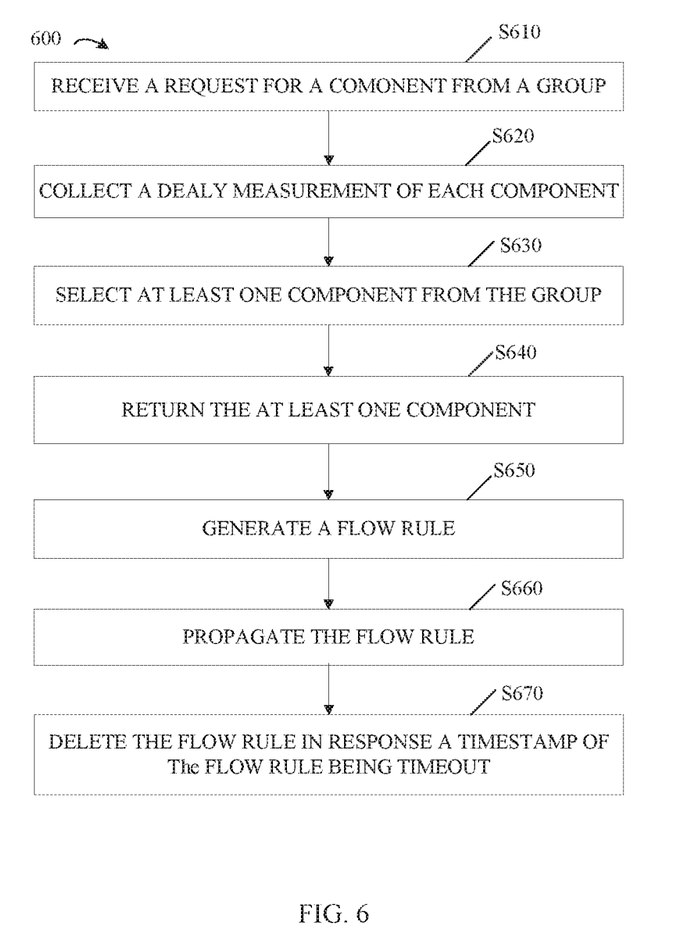
FIG. 6 depicts a schematic flowchart of a method 600 for selecting a next hop for a packet along a service function path in an SFC-enabled domain according to an embodiment of the present invention.

FIG. 6 depicts a schematic flowchart of a method 600 for selecting a next-hop for a packet along an SFP in an SFC-enabled domain according to an embodiment of the present invention. The flowchart may be executed by the SFC controller 506 in FIG. 5. Referring to FIG. 6, at step S610, an SFC controller may receive a request for a next-hop component from a group. The SFC controller may know that the GSFF may include a plurality of components, and each of the plurality of components may have a substantially similar function.

At step S620, the SFC controller may collect a delay measurement for packets of each of the plurality of components. In a manner of the regular collection, the measurement agent may have monitored the delay measurement for packets of each of the plurality of components and the SFC controller may have collected the delay measurement for packets of each of the plurality of components. In the manner of the request-based collection, the measurement agent may start to monitor the delay measurement for packets of each of the plurality of components and the SFC controller may collect the delay measurement for packets of each of the plurality of components at this time.

At step S630, the SFC controller may select at least one component from the plurality of components based on the delay measurement for packets of each of the plurality of components. Then at step S630, the SFC controller may return an indicator indicating the at least one component as a response to the request.

At step S640, the SFC controller may receive a second request for a next-hop SFI from an GSFI. At step S650, the SFC controller may select at least one SFI from the plurality of SFIs based on the delay measurement for packets of each of the plurality of service function instances. At step S660, the SFC controller may return a second indicator indicating the selected at least one SFI as a second response to the second request.

In some embodiments, The SFC controller may select at least one component in which the delay measurement is less than the predefined threshold.

In some embodiments, the SFC controller may just return an indicator indicating one next-hop component as the response. In one implementation, the SFC controller may randomly determine a next-hop component from the at least one candidate components. In another implementation, the SFC controller may sort the delay measurement of each of the at least one candidate component and then may return an indicator indicating a next-hop component with a minimum delay measurement from the at least one candidate component as the response. In yet another implementation, the SFC controller may select a next-hop component from the at least one candidate component based on the weight of each of the at least one candidate component.

At step S650, the SFC controller may generate a flow rule after the SFC controller returns the indicator indicating the at least one component. At step S660, the SFC controller may propagate the flow rule to necessary components or a specific component in the same SFC domain. In some embodiments, a timestamp of the flow rule can be added into the flow rule. At step S670, the flow rule may be deleted if the timestamp is expired.

In some alternative implementations, the functions noted in the block may occur out of the order noted in the FIG. 6. For example, two blocks shown in succession may, in fact, be executed substantially concurrently, or the blocks may sometimes be executed in the reverse order, depending upon the functionality involved.

Figure 7:
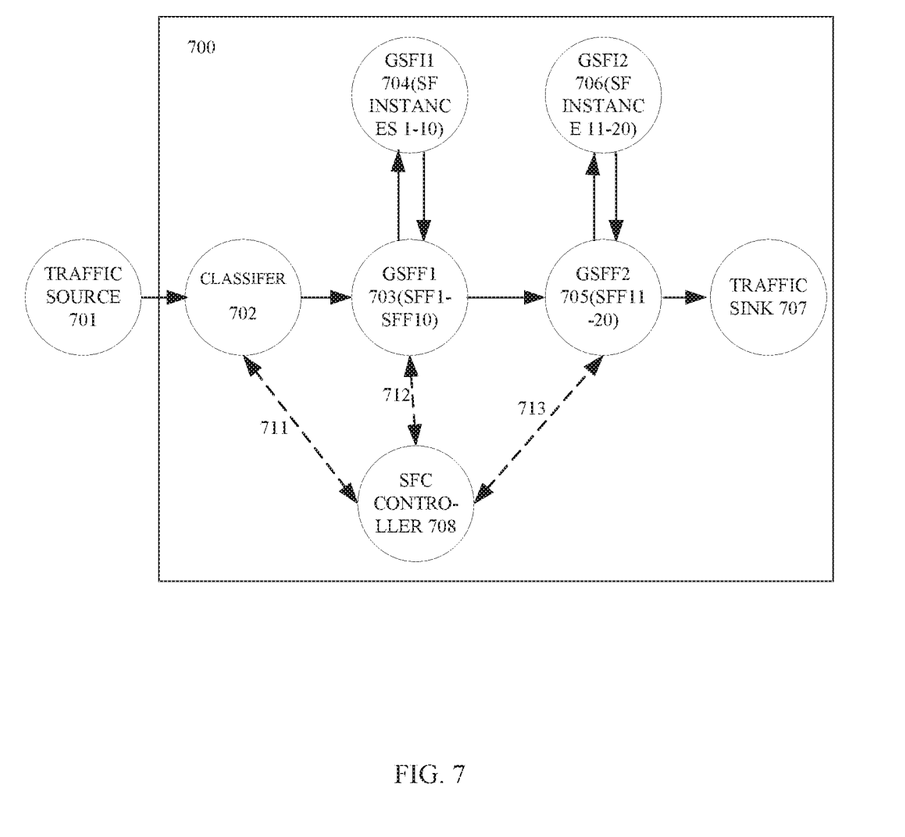
FIG. 7 depicts a schematic flowchart for a packet to select a next-hop SFF/SFI along an SFP in an SFC-enabled domain according to an embodiment of the present invention.

FIG. 7 depicts a schematic flowchart for a packet to select a next-hop SFF/SFI along an SFP in an SFC-enabled domain 700 according to an embodiment of the present invention. Referring to FIG. 7, a first packet from a traffic source 701 may be received by a classifier 702. The classifier 702 may first contact an SFC controller 708 to get an SFP for the first packet as indicated by the reference number 711, for example, the SFP is assumed to be {GSFF1, GSFI1, GSFF2, GSFI2, traffic sink 707}. After the SFP is received, the classifier 702 may encapsulate the first packet as an SFC encapsulated packet and may determine that a next-hop GSFF1 along the SFP is a group of SFFs including SFF1-SFF10. Afterwards the classifier 702 may contact the SFC controller 708 to get a next-hop SFF for the first packet as indicated still by the reference number 711.

By way of example, the SFC controller 708 may return an indicator indicating {SFF1, SFF3, SFF8, SFF10} to the classifier 702 using the method 600. At this time, the SFC controller 708 may add these contents to Table 2 as shown in line 2 of Table 2 and also may propagate the contents in line 2 of Table 2 to components in the domain 700, such as the classifier 702, each SFF in the GSFF1 703, each SFI in the GSFI1 704, each SFF in the GSFF2 705, each SFI in the GSFI2 706 and the traffic sink 707. When the classifier 702 gets the returned indicator indicating {SFF1, SFF3, SFF8, SFF10} and the contents in line 2 of Table 2, the classifier 702 may select randomly, such as the SFF1, to be the next-hop SFF and then may forward the first packet to the SFF1.

After that, the SFF1 may get the first packet and may determine that a next-hop GSFI1 along the SFP is a group of SFIs including SF1-SF10. The SFF1 may then contact the SFC controller 708 to get a next-hop SFI for the first packet as indicated by the reference number 712. For example, the SFC controller 708 may return an indicator indicating {SF4, SF5, SF9} to the SFF1 using the method 600. At this time, the SFC controller 708 may add these contents to Table 2 as shown in line 3 of Table 2. The SFC controller 708 may also propagate the contents in line 3 of Table 2 to the components in the domain 700. The SFF1 may then get the returned indicator indicating {SF4, SF5, SF9} and the contents in line 3 of Table 2. The SFF1 may randomly select, for example the SF9, to be the next-hop SFI. The SFF1 may then forward the first packet to the SF9.

Once the SF9 gets the first packet, the SF9 may process the packet and may return the packet to the SFF1. The SFF1 may subsequently determine that a next-hop GSFF2 along the SFP is a group of SFFs including SF11-SF20. Then the SFF1 may contact the SFC controller 708 to get a next-hop SFF for the first packet as indicated still by the reference number 712. For example, the SFC controller 708 may return an indicator indicating {SFF12, SFF14, SFF17, SFF19} to the SFF1 using the method 600. At this time, the SFC controller 708 may add these contents to Table 2 as shown in line 4 of Table 2. The SFC controller 708 may also propagate the contents in line 4 of Table 2 to the components in the domain 700. When the SFF1 gets the returned indicator indicating {SFF12, SFF14, SFF17, SFF19} and the contents in line 4 of Table 2, the SFF1 may select randomly such as the SFF17 to be the next-hop SFF and then may forward the first packet to the SFF17.

After the first packet is received by the SFF17, the SFF17 may determine that a next-hop GSFI2 along the SFP is a group of SFIs including SF11-SF20. The SFF17 may then contact the SFC controller 708 to get a next-hop SFI for the first packet as indicated by the reference number 713. For example, the SFC controller 708 may return an indicator indicating {SF11, SF15, SF18, SF20} to the SFF17 using the method 600. At this time, the SFC controller 708 may add these contents to Table 2 as shown in line 5 of Table 2. The SFC controller may also propagate the contents in line 5 of Table 2 to the components in the domain 700. After that, the SFF17 may get the returned {SF11, SF15, SF18, SF20} and the contents in line 5 of Table 2. The SFF17 may then select randomly, for example the SF18, to be the next-hop SFI and then may forward the first packet to the SF18.

When the SF18 gets the first packet, the SF18 may handle the packet and return the packet to the SFF17. Next, the SFF17 may determine a next hop is the traffic sink 707, which is not a group. The SFF17 may then forward the first packet directly to the traffic sink 707. In each component, at least one delay sensitive next-hop SFF/SFI is selected, and one SFF/SFI is randomly selected from the at least one delay sensitive SFF/SFI, which can make sure high throughput of the system.

TABLE 2

| Group | Next hop | Timestamp |
| --- | --- | --- |
| GSFF1 | SFF1, SFF3, SFF8, SFF10 | 15:23:00:00 2019/02.25 |
| GSFI1 | SF4, SF5, SF9 | 15:23:00:00 2019/02.25 |
| GSFF2 | SFF12, SFF14, SFF17, SFF19 | 15:23:00:00 2019/02.25 |
| GSFI2 | SF11, SF15, SF18, SF29 | 15:23:00:00 2019/02.25 |

With continued reference to FIG. 7, if a second packet from the traffic source 701 is received by the classifier 702 before 15:23:00:00 2019/02/25, the classifier 702 may need not contact the SFC controller 708 as the classifier 702 may have the contents of Table 2. The classifier 702 may selects one SFF from {SFF1, SFF3, SFF8, SFF10}, such as the SFF3, and may then forward the second packet to the SFF3. Similarly, the SFF3 may randomly select the SF5 from {SF4, SF5, SF9} without contacting with the SFC controller 708 and may forward the second packet to the SF5. The SF5 may randomly select the SFF14 from {SFF12, SFF14, SFF17, SFF19} without contacting with the SFC controller 708 and may forward the second packet to the SFF14. The SFF14 may randomly select the SF11 from {SF11, SF15, SF18, SF20} without contacting with the SFC controller 708 and may forward the second packet to the SF11. At last, the SF11 may forward the second packet to the traffic sink 707. In each component, an original SFF/SFI selection may be reused, which may make sure the high throughput of the system once more.

While if a third packet from the traffic source 701 is received by the classifier 702 after 15:23:00:00 2019/02/25, the contents in Table 2 in each component in the domain 700 may have been deleted as the timestamp has expired. A forwarding process for the third packet may be similar to the forwarding process for the first packet. This implementation may make sure that a delay sensitive next-hop SFF/SFI is always selected by the SFC controller.

In embodiments of the invention, a next-hop SFF/SF selection mechanism is proposed to make sure a delay sensitive and high throughput SFC forwarding is achieved. With this invention, the network controller may get an optional next-hop SFP/SFI by choosing the delay sensitive next-hop SFF/SFI among the candidate SFFs/SFIs while considering load balancing among those SFFs/SFIs.

The present invention may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by one or more processors, a request for selecting a next-hop component for a packet from a group in a service function chain enabled domain, wherein the group comprises a plurality of components and each of the plurality of components has a substantially similar function in the service function chain enabled domain;
   collecting, by the one or more processors, a delay measurement for packets of each of the plurality of components from a measurement agent in the service function chain enabled domain which monitors the delay measurement for the packets of each of the plurality of components;
   selecting, by the one or more processors, at least one component from the plurality of components based on the delay measurement for the packets of each of the plurality of components; and
   returning, by the one or more processors, an indicator indicating the selected at least one component as a response to the request;
   wherein any component of the plurality of components comprises one of following: a service function forwarder and a service function instance.

2. The method of claim 1, wherein the delay measurement of each of the selected at least one component is less than a predefined threshold.

3. The method of claim 2, wherein the returning the indicator indicating the selected at least one component as the response to the request comprises:
   determining, by the one or more processors, a component randomly from the selected at least one component; and
   returning, by the one or more processors, the indicator indicating the determined component as the response to the request.

4. The method of claim 2, wherein the returning the indicator indicating the selected at least one component as the response to the request comprises:
   sorting, by the one or more processors, the delay measurement of each of the at least one component;
   determining, by the one or more processors, a component with a minimum delay measurement from the selected at least one component; and
   returning, by the one or more processors, the indicator indicating the component with the minimum delay measurement as the response to the request.

5. The method of claim 1, further comprising:
   generating, by the one or more processors, a flow rule comprising the selected at least one component; and
   propagating, by the one or more processors, the flow rule to components in the service function chain enabled domain.

6. The method of claim 5, wherein the flow rule comprises a timestamp, and the flow rule is deleted in the service function chain enabled domain in response to the timestamp being expired.

7. A computer system, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   receiving, by the one or more processors, a request for selecting a next-hop component for a packet from a group in a service function chain enabled domain, wherein the group comprises a plurality of components and each of the plurality of components has a substantially similar function in the service function chain enabled domain;
   collecting, by the one or more processors, a delay measurement for packets of each of the plurality of components from a measurement agent in the service function chain enabled domain which monitors the delay measurement for the packets of each of the plurality of components;
   selecting, by the one or more processors, at least one component from the plurality of components based on the delay measurement for the packets of each of the plurality of components; and
   returning, by the one or more processors, an indicator indicating the selected at least one component as a response to the request;
   wherein any component of the plurality of components comprises one of following: service function forwarder and service function instance.

8. The computer system of claim 7, wherein the delay measurement of each of the selected at least one component is less than a predefined threshold.

9. The computer system of claim 8, wherein the returning the indicator indicating the selected at least one component as the response to the request comprises:
   determining, by the one or more processors, a component randomly from the at least one component; and
   returning, by the one or more processors, the indicator indicating the determined component as the response to the request.

10. The computer system of claim 8, wherein the returning the indicator indicating the selected at least one component as the response to the request comprises:
    sorting, by the one or more processors, the delay measurement of each of the at least one component;
    selecting, by the one or more processors, a component with a minimum delay measurement from the at least one component; and
    returning, by the one or more processors, the indicator indicating the component with the minimum delay measurement as the response to the request.

11. The computer system of claim 7, wherein returning the indicator indicating the at least one component as the response to the request comprise:
   generating, by the one or more processors, a flow rule comprising the selected at least one component; and
   propagating, by the one or more processors, the flow rule to components in the service function chain enabled domain.

12. The computer system of claim 11, wherein the flow rule comprises a timestamp, and the flow rule is deleted in the service function chain enabled domain in response to the timestamp being expired.

13. A computer program product, comprising:
   one or more computer readable tangible storage media and program instructions stored on the one or more computer readable tangible storage media, the program instructions comprising:
      program instructions to receive a request for selecting a next-hop component for a packet from a group in a service function chain enabled domain, wherein the group comprises a plurality of components, and each of the plurality of components has a substantially similar function in the service function chain enabled domain;
      program instructions to collect a delay measurement for packets of each of the plurality of components from a measurement agent in the service function chain enabled domain which monitors the delay measurement for the packets of each of the plurality of components;
      program instructions to select at least one component from the plurality of components based on the delay measurement for packets of each of the plurality of components; and
      program instructions to return an indicator indicating the selected at least one component as a response to the request;
   wherein any component of the plurality of components comprises one of following: service function forwarder and service function instance.

14. The computer program product of claim 13, wherein the delay measurement of each of the selected at least one component is less than a predefined threshold.

15. The computer program product of claim 14, wherein the program instructions to return the indicator indicating the selected at least one component as the response to the request comprise:
   program instructions to determine a component randomly from the selected at least one component; and
   program instructions to return an indicator indicating the determined component as the response to the request.

16. The computer program product of claim 14, wherein the program instructions to return an indicator indicating the selected at least one component as the response to the request comprise:
   program instructions to sort the delay measurement of each of the at least one component;
   program instructions to select a component with a minimum delay measurement from the at least one component; and
   program instructions to return an indicator indicating the component with the minimum delay measurement as the response to the request.

17. The computer program product of claim 13, wherein the program instructions further comprise:
   program instructions to generate a flow rule comprising the selected at least one component; and
   program instructions to propagate the flow rule to components in the service function chain enabled domain.

18. The computer program product of claim 17, wherein the flow rule comprises a timestamp, and the flow rule is deleted in the service function chain enabled domain in response to the timestamp being expired.

* * * * *